(12) United States Patent
Okumura

(10) Patent No.: US 8,579,556 B2
(45) Date of Patent: Nov. 12, 2013

(54) INSERT FOR DRILL, DRILL AND METHOD OF CUTTING WORK MATERIAL

(75) Inventor: Takashi Okumura, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 1139 days.

(21) Appl. No.: 12/525,445

(22) PCT Filed: Jan. 30, 2008

(86) PCT No.: PCT/JP2008/051443
§ 371 (c)(1),
(2), (4) Date: Jul. 31, 2009

(87) PCT Pub. No.: WO2008/093748
PCT Pub. Date: Aug. 7, 2008

(65) Prior Publication Data
US 2010/0061821 A1    Mar. 11, 2010

(30) Foreign Application Priority Data
Jan. 31, 2007    (JP) ................................. 2007-022179

(51) Int. Cl.
*B23B 51/02*    (2006.01)

(52) U.S. Cl.
USPC .......................................... 408/225; 408/224

(58) Field of Classification Search
USPC ................................................ 408/224, 225
See application file for complete search history.

(56) References Cited

U.S. PATENT DOCUMENTS

| 4,318,645 | A |   | 3/1982 | McCreery |
| 5,593,255 | A | * | 1/1997 | Satran et al. ................. 407/113 |

(Continued)

FOREIGN PATENT DOCUMENTS

| DE | 3133159 A1 | 3/1982 |
| DE | 69702040 T2 | 9/2000 |

(Continued)

OTHER PUBLICATIONS

German language office action dated Jan. 9, 2013 and its English language translation issued in corresponding German application 112008000315.7.

(Continued)

*Primary Examiner* — David Bryant
*Assistant Examiner* — Jason L Vaughan
(74) *Attorney, Agent, or Firm* — DLA Piper LLP (US)

(57) ABSTRACT

An insert for a drill, a drill using the insert for a drill, and a method of cutting a work material are provided. The insert has an insert main body provided with a top surface and a side surface, a first cutting edge being formed on one side of an intersection part between the top surface and the side surface, a second cutting edge being formed on the other side of the intersection part between the top surface and the side surface, and being intersected with a virtual extension of the first cutting edge or the first cutting edge so as to have an outward convexity when viewed from above, a first breaking groove being formed in a concave shape along the first cutting edge in the top surface and having a maximum groove width at an end portion of the first cutting edge adjacent to the second cutting edge, and a second breaking groove being formed in a concave shape along the second cutting edge in the top surface and having a maximum groove width at an end portion of the second cutting edge adjacent to the first cutting edge.

14 Claims, 9 Drawing Sheets

(56) References Cited

U.S. PATENT DOCUMENTS

| | | | |
|---|---|---|---|
| 5,954,459 A | 9/1999 | Noguchi et al. | |
| 5,971,676 A | 10/1999 | Kojima | |
| 7,070,363 B2 * | 7/2006 | Long et al. | 407/113 |

FOREIGN PATENT DOCUMENTS

| | | |
|---|---|---|
| DE | 69629892 T2 | 7/2004 |
| JP | 10-071516 | 3/1998 |
| JP | 10071516 A | 3/1998 |
| JP | 11-235606 | 8/1999 |
| JP | 2000-107920 | 4/2000 |
| JP | 2000202703 A * | 7/2000 ... B23B 27/00 |
| JP | 2001-239412 | 9/2001 |
| JP | 2003-062712 | 3/2003 |
| JP | 2007203454 A * | 8/2007 |
| JP | 2009285760 A * | 12/2009 |
| JP | 2010099778 A * | 5/2010 |
| WO | WO 2007114146 A1 * | 10/2007 |

OTHER PUBLICATIONS

Chinese language office action dated Nov. 10, 2010 and its English language translation for corresponding Chinese application 200880003838.9.

* cited by examiner (a)

(b)

(c)

INSERT FOR DRILL, DRILL AND METHOD OF CUTTING WORK MATERIAL

CROSS-REFERENCE TO THE RELATED APPLICATIONS

This application is a national stage of international application No. PCT/JP2008/051443 filed on Jan. 30, 2008, which also claims the benefit of priority under 35 USC 119 to Japanese Patent Application No. 2007-022179 filed on Jan. 31, 2007, the entire contents of which are incorporated herein by reference.

TECHNICAL FIELD

The present invention relates to an insert for a drill mounted on a hole drilling tool for machining a hole, a drill using the insert for a drill, and a method of cutting a work material.

BACKGROUND ART

Examples of conventional hole drilling tools for machining a hole in a work material, such as metal, include a throwaway type drill. This drill detachably mounts, on the tip end portion of a substantially cylindrical holder, an inner blade insert provided with an inner cutting edge part for cutting the inner peripheral side of a hole bottom surface, and an outer blade insert provided with an outer cutting edge part for cutting the outer peripheral side of the hole bottom surface. On this occasion, the rotation loci of the inner cutting edge part and the outer cutting edge part intersect each other.

Here, there is an insert for a drill which is provided with both of the inner cutting edge part and the outer cutting edge part (for example, refer to Japanese Unexamined Patent Application Publication No. 11-235606). This type of insert for a drill (hereinafter also referred to simply as an "insert") is convenient because it is applicable to both of the inner blade insert and the outer blade insert.

The insert as described in the above publication has a cutting edge at an intersection part between the top surface and the side surface of an insert main body in a polygonal plate shape. The cutting edge has an inner cutting edge part and an outer cutting edge part adjacent to the inner cutting edge part. A through hole extending to the bottom surface of the insert is formed at the central part of the top surface. The through hole is used for fixing the insert to an insert pocket of a holder, and the insert has a 180-degree rotationally symmetric shape with respect to the central axis of the through hole.

In the top surface, a breaking groove is formed in a concave shape along the cutting edge. The breaking groove is used for disposing of chips, and has a rake face part and a rise face part in order of increasing distance from the cutting edge. The rake angle of the rake face part and the rise angle of the rise face part are adjusted to any angle, respectively, depending on work materials.

In use, two inserts of this type are mounted on a holder. One of these two inserts is mounted as an inner blade insert and the other is mounted as an outer blade insert on the tip end part of the holder. Specifically, the inner blade insert and the outer blade insert are mounted on the tip end part of the substantially cylindrical shaped holder in different mounting directions, namely, radially inwardly of the holder and radially outwardly of the holder, respectively.

That is, the inner blade insert and the outer blade insert are mounted so that the inner cutting edge part and the outer cutting edge part are projected from axial tip end of the holder, respectively. On this occasion, the rotation loci of the inner cutting edge part and the outer cutting edge part on the axial tip end side intersect each other. Then, by rotating the holder around the axis of the holder, hole machining of a work material is carried out by the inner blade insert and the outer blade insert.

Here, each of the inner cutting edge part and the outer cutting edge part in the insert has a bent portion that is bent in a convex shape when the insert is viewed from above. The bent portion is used for adjusting the balance of cutting resistance exerted on the inner cutting edge part and the outer cutting edge part. However, when the bent portion is present, with the insert mounted on the holder, cutting edges having opposite inclinations with the bent portion in between are formed in the cutting edge parts with respect to the hole bottom surface.

That is, inner cutting edge parts having the opposite inclinations with the bent portion in between are formed in the inner cutting edge part of the inner blade insert with respect to the hole bottom surface. Outer cutting edge parts having the opposite inclinations with the bent portion in between are formed in the outer cutting edge part of the outer blade insert with respect to the hole bottom surface.

When hole machining is performed by using the above-mentioned insert, chips are generated from the opposite directions with the bent portion in between, and hence partially generated chips will collide with each other. Therefore, chips generated in the vicinity of the bent portion are considerably squeezed, and the chip thickness in the vicinity of the bent portion may be increased. As a result, there has been the problem that the chips are welded onto the wall surface of the breaking groove corresponding to such a portion, and this portion is subjected to local increase in cutting resistance, resulting in the cutting edge chipping. This problem has become significant in the outer cutting edge part whose rotation speed is high.

DISCLOSURE OF THE INVENTION

An advantage of the invention is to provide an insert for a drill and a drill each having excellent chip discharging performance, and also a method of cutting a work material.

An insert for a drill of the invention comprises an insert main body provided with a top surface and a side surface, a first cutting edge formed on one side of an intersection part of the top surface and the side surface, and a second cutting edge formed on the other side of the intersection part of the top surface and the side surface. The second cutting edge is intersected with a virtual extension of the first cutting edge or the first cutting edge so as to have an outward convexity when viewed from above. The insert further has a first breaking groove comprises a concave shape along the first cutting edge in the top surface and a maximum groove width at an end portion of the first cutting edge, the end portion of the first cutting edge is adjacent to the second cutting edge, and a second breaking groove comprises a concave shape along the second cutting edge in the top surface and a maximum groove width at an end portion of the second cutting edge, the end of the second cutting edge is adjacent to the first cutting edge.

Other insert for a drill of the invention comprises an insert main body provided with a top surface and a side surface, a first cutting edge formed on one side of an intersection part of the top surface and the side surface, a second cutting edge formed on the other side of the intersection part of the top surface and the side surface. The second cutting edge is intersected with a virtual extension of the first cutting edge or the first cutting edge so as to have an outward convexity when viewed from above. A first breaking groove comprises a concave shape along the first cutting edge in the top surface, and a second breaking groove comprises a concave shape along the second cutting edge in the top surface. Further, a first rise face part is formed so that it is positioned adjacent to the center of the top surface in a face part constituting the first breaking groove, and inclined so as to be higher from outside toward inside of the top surface, and so that it has a minimum rise angle at an end portion of the first cutting edge, the end portion of the first cutting edge is adjacent to the second cutting edge. A second rise face part is formed so that it is positioned adjacent to the center of the top surface in a face part constituting the second breaking groove, and inclined so as to be higher from outside toward inside of the top surface, and so that it has a minimum rise angle at an end portion of the second cutting edge, the end portion of the second cutting edge is adjacent to the first cutting edge.

A still other insert for a drill of the invention comprises an insert main body provided with a top surface and a side surface, a first cutting edge formed on one side of an intersection part of the top surface and the side surface, a second cutting edge formed on the other side of the intersection part of the top surface and the side surface. The second cutting edge is intersected with a virtual extension of the first cutting edge or the first cutting edge so as to have an outward convexity when viewed from above. A first breaking groove comprises a concave shape along the first cutting edge in the top surface. A second breaking groove comprises a concave shape along the second cutting edge in the top surface. Further, a first rake face part is formed so that it is positioned adjacent to the first cutting edge in a face part constituting the first breaking groove, and is inclined so as to be lower from outside toward inside of the top surface, and so that it has a minimum rake angle at an end portion of the first cutting edge, the end portion of the first cutting edge is adjacent to the second cutting edge. A second rake face part is formed so that it is positioned adjacent to the second cutting edge in a face part constituting the second breaking groove, and inclined so as to be lower from outside toward inside of the top surface, and so that it has a minimum rake angle at an end portion of the second cutting edge, the end portion of the second cutting edge is adjacent to the first cutting edge.

A drill of the invention comprises a holder provided with an insert pocket formed at a tip end portion thereof, and the insert for a drill which is attached to the insert pocket with at least a portion of the first cutting edge and at least a portion of the second cutting edge projected from a tip end of the holder.

A method of cutting a work material of the invention comprises the following steps: (i) the step of bringing the first cutting edge, the second cutting edge and the third cutting edge of the drill near the work material, and rotating at least one of the above-mentioned drill and the work material; (ii) the step of cutting the work material by bringing at least portions of the first cutting edge, the second cutting edge and the third cutting edge of the drill into contact with the surface of the work material; and (iii) the step of keeping the first cutting edge, the second cutting edge and the third cutting edge away from the work material.

In the insert for a drill of the invention, the second cutting edge is intersected with a virtual extension of the first cutting edge or the first cutting edge so as to have the outward convexity in a plan view. Therefore, the insert has a bent portion being bent in a convex shape in the plan view. The groove width of the breaking groove corresponding to the bent portion is larger than the groove width of the breaking groove corresponding to a portion other than the bent portion. Although this increases the thickness of chips generated in the vicinity of the bent portion, the groove width of the breaking groove corresponding thereto is increased, thus permitting a smooth flow of chips generated. Hence, the insert for a drill, the drill using the same, and the method of cutting a work material according to the invention are capable of reducing situations where chips are welded onto the wall surface of the breaking groove, and cutting resistance increases, thereby exhibiting excellent chip discharging performance.

In other insert for a drill of the invention, the second cutting edge is intersected with a virtual extension of the first cutting edge or the first cutting edge so as to have the outward convexity in a plan view. Therefore, the insert has a bent portion being bent in a convex shape in the plan view. The rise angle of the rise face part of the breaking groove corresponding to the bent portion is smaller than the rise angle of the rise face part corresponding to a portion other than the bent portion. This permits a smooth flow of chips generated. Hence, other insert for a drill, the drill using the same, and the method of cutting a work material according to the invention are capable of reducing situations where chips are welded onto the wall surface of the breaking groove, and cutting resistance increases, thereby exhibiting excellent chip discharging performance.

In the still other insert for a drill of the invention, the second cutting edge is intersected with the virtual extension of the first cutting edge or the first cutting edge so as to have the outward convexity in a plan view. Therefore, the insert has a bent portion being bent in a convex shape in the plan view. The rake angle of the rake face part of the breaking groove corresponding to the bent portion is smaller than the rake angle of the rake face part corresponding to a portion other than the bent portion. This permits a smooth flow of chips generated. Hence, the still other insert for a drill, the drill using the same, and the method of cutting a work material according to the invention are capable of reducing situations where chips are welded onto the wall surface of the breaking groove, and cutting resistance increases, thereby exhibiting excellent chip discharging performance.

BRIEF DESCRIPTION OF THE DRAWINGS

FIG. 5(b) is a diagram showing a cross section taken along the line II-II in FIG. 5.

PREFERRED MODE FOR CARRYING OUT THE INVENTION

Insert for Drill

First Preferred Embodiment

Figure 1:
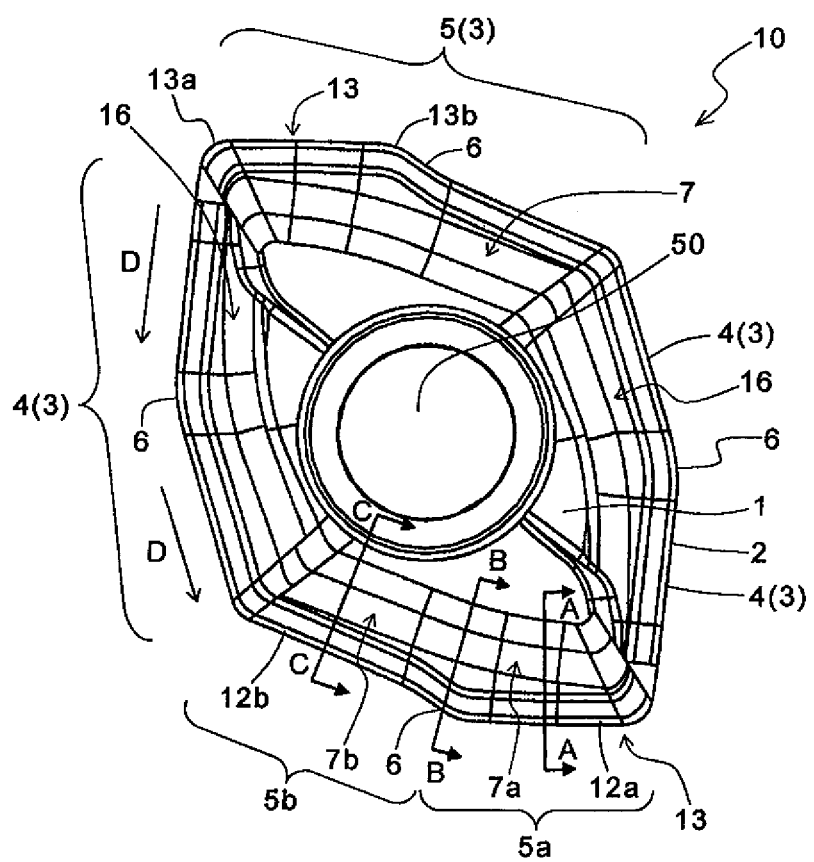
FIG. 1 is a plan view showing an insert for a drill according to a first preferred embodiment of the invention.
Figure 2:
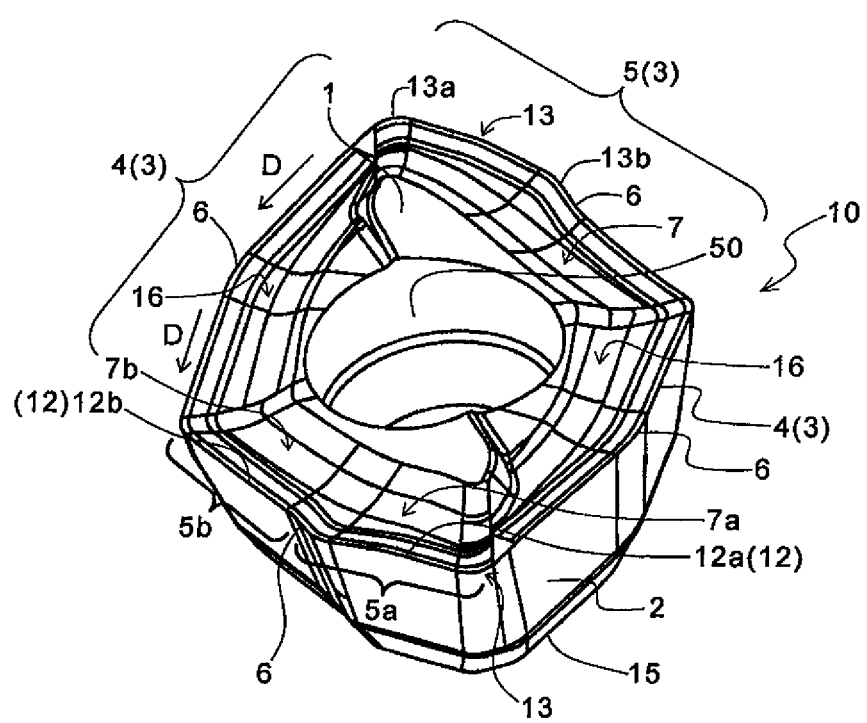
FIG. 2 is a perspective view showing the insert for a drill according to the first preferred embodiment of the invention.

A first preferred embodiment of the insert of the invention will be described in detail with reference to FIGS. 1 to 3(*c*). As shown in FIGS. 1 and 2, an insert 10 according to the present preferred embodiment has a top surface 1 of an insert main body and a cutting edge 3 formed at an intersection part between the top surface 1 of the insert main body and a side surface 2 forming a flank face. The insert main body is in a plate shape, specifically a polygonal plate shape. The insert main body is constructed from one in which a sintered body, such as cemented carbide, cermet, or ceramics, is covered with a film.

The film is used for improving the wear resistance of the insert 10. Examples of the composition of the film include titanium-based compounds such as titanium carbide, titanium nitride and titanium carbon nitride, and alumina. The film may include at least one layer, or may be made of a plurality of layers. The insert main body is not limited to those coated with the above-mentioned film. Alternatively, those composed of a sintered body, such as cemented carbide, cermet, or ceramics, without being coated with the film, may be used.

A through hole 50 extending to a bottom surface 15 of the insert main body is formed at the central part of the top surface 1. The through hole 50 is used for fixing the insert 10 to a later-described holder. The insert 10 has a 180-degree rotationally symmetrical shape with respect to the central axis of the through hole 50. This is economical because, when one cutting edge in use is worn, the other cutting edge not yet used can be used by rotating the insert 10 through 180 degrees.

The cutting edge 3 has an inner cutting edge part 4 for cutting the inner peripheral side of the hole bottom surface, and an outer cutting edge part 5 that is adjacent to the inner cutting edge part 4 and cuts the outer peripheral side of the hole bottom surface. Each of the inner cutting edge part 4 and the outer cutting edge part 5 has a bent portion 6 being bent in a convex shape when the insert 10 is viewed from above.

The outer cutting edge part 5 has on its one end side a projecting portion 13 that projects outward from the insert main body when viewed from above. This improves the biting action of the outer cutting edge part 5 into a work material, thereby reducing the cutting edge chipping. The projecting portion 13 has R end portions 13*a* and 13*b*. These R end portions 13*a* and 13*b* mean those which the angle formed between straight lines being continuous with both ends of a curve portion, respectively, when viewed from above, is approximately 90°. Specifically, the angles formed between these straight lines are in the range of 60° to 160°. Additionally, by disposing a concave-shaped cutting edge portion adjacent to the R end portion 13*b* so as to increase a level-difference portion between the projecting portion and other cutting edge portion, chips can be cut into pieces, thus improving chip discharging performance. Specifically, like a later-described second preferred embodiment, the level-difference portion can be further increased by selecting a smaller value, namely an acute angle in the above-mentioned range, as the angle formed between straight lines being continuous with both ends of the curve portions of the R end portions.

Thus, chips can be surely cut into pieces, and chip discharging performance can be effectively improved. The construction of the outer cutting edge part 5 is not limited to the construction that the projecting portion 13 is disposed on its end side. Depending on the purpose, the projecting portion 13 may not be disposed.

A breaking groove 7 is formed in a concave shape along the outer cutting edge part 5 in the top surface 1. The breaking groove 7 is used for disposing of chips. As shown in FIGS. 3(*a*) to 3(*c*), the breaking groove 7 has a rake face part 8 and a rise face part 9 in order of increasing distance from the outer cutting edge part 5, with a later-described land 12 in between.

The rake face part 8 is positioned adjacent to the outer cutting edge part 5 in the face part constituting the breaking groove 7, and inclined so as to become lower from outside toward inside of the top surface 1. That is, the rake face part 8 is inclined downward at a predetermined rake angle with respect to the outer cutting edge part 5. The rise face part 9 is positioned adjacent to the center of the top surface 1 in the face part constituting the breaking groove 7, and inclined so as to become higher from outside toward inside of the top surface 1. That is, the rise face part 9 is inclined upward at a predetermined rise angle from the rake face part 8 toward inside of the insert 10 (toward the through hole 50). Thus, the rake face part 8 and the rise face part 9 are formed so that they extend once downward and then upward from the outer cutting edge part 5 toward inside of the insert 10. Thereby, the chips generated by the outer cutting edge part 5 can be curled by the rake face part 8 and formed into a spring shape, and then discharged by the rise face part 9.

Here, as shown in FIGS. 1 and 2, the outer cutting edge part 5 has a first cutting edge 5*a* formed on one side (the projecting portion 13) of an intersection part between the top surface 1 and the side surface 2, and a second cutting edge 5*b* formed on the other side of the intersection part. The second cutting edge 5*b* is intersected with the first cutting edge 5*a* so as to have an outward convexity when viewed from above. This results in the bent portion 6 being bent in the convex shape when viewed from above.

When viewed from above, the angle formed between the first cutting edge 5*a* and the second cutting edge 5*b* is 15° to 30°. This optimizes the effect of the bent portion 6, namely, adjusting the balance of cutting resistance exerted on the inner cutting edge part 4 and the outer cutting edge part 5.

The breaking groove 7 has a first breaking groove 7*a* lying along the first cutting edge 5*a* in the top surface 1, and a second breaking groove 7*b* lying along the second cutting edge 5*b* in the top surface 1. The first breaking groove 7*a* has a maximum groove width at an end portion of the first cutting edge 5*a* adjacent to the second cutting edge 5*b*, and the second breaking groove 7*b* has a maximum groove width at an end portion of the second cutting edge 5*b* adjacent to the first cutting edge 5*a*. The groove width at the end portion of the first breaking groove 7*a* adjacent to the second cutting edge 5*b*, and the groove width at the end portion of the second breaking groove 7*b* adjacent to the first cutting edge 5*a* are the same.

Figure 3:
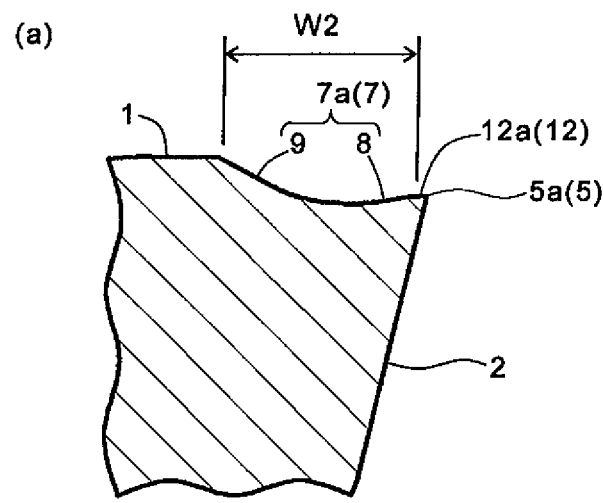
FIG. 3(a) is a diagram showing a cross section taken along the line A-A in FIG. 1.
FIG. 3(b) is a diagram showing a cross section taken along the line B-B in FIG. 1.
FIG. 3(c) is a diagram showing a cross section taken along the line C-C in FIG. 1.
Figure 3:
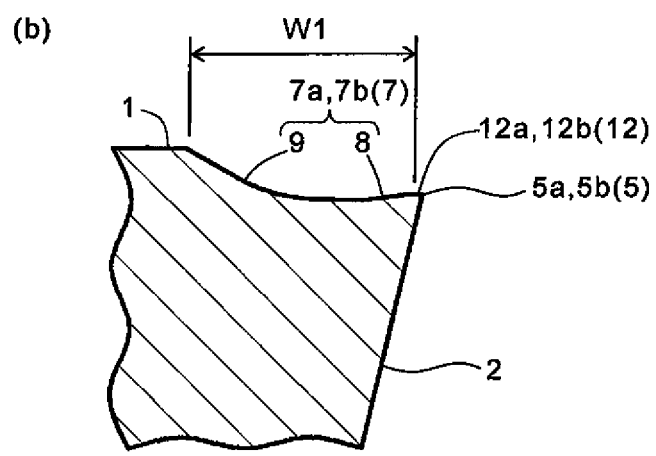
Figure 3:
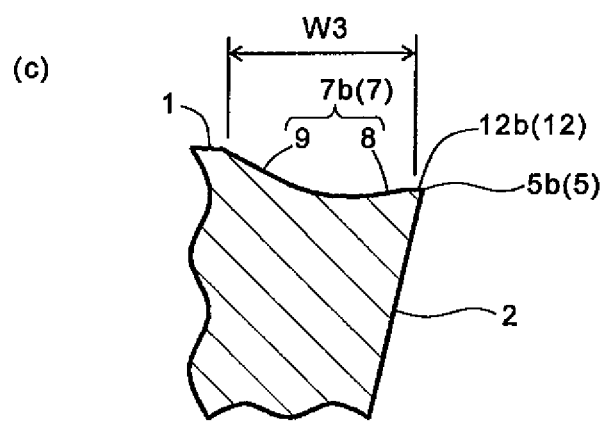

That is, a groove width W1 of the breaking groove corresponding to the bent portion 6 of the outer cutting edge part 5 shown in FIG. 3(*b*) is larger than each of groove widths W2 and W3 of other portions of the breaking groove corresponding to portions other than the bent portion 6 shown in FIGS. 3(*a*) and 3(*c*), respectively. This permits a smooth flow of chips generated by the outer cutting edge part 5. It is therefore possible to reduce situations where chips are welded onto the wall surface of the breaking groove 7, and cutting resistance increases, thereby exhibiting excellent chip discharging performance. That is, the present construction reduces situations where the generated chips are throttled in the vicinity of the bent portion 6 thereby to partially cause a great increase in chip thickness. Further, even if chips are subjected to local increase in chip thickness, it is possible to decrease shock occurred when these chips collide with the wall surface of the breaking groove 7. As a result, the generated chips can be discharged more smoothly.

The groove width W1 is approximately 1 to 2 mm, preferably 1.3 to 1.8 mm. The groove widths W2 and W3 are approximately 0.8 to 1.6 mm, preferably 1.1 to 1.4 mm. It is desirable that these groove widths W1 to W3 satisfy the above-mentioned predetermined relationship within these numerical ranges as illustrated above, in order to enhance the effect described above. In order to establish the predetermined relationship among these groove widths W1 to W3, for example, an end portion of the rise face part 9 of the outer cutting edge part 5, which is adjacent to the inside of the insert, may be retracted so as to depart from the outer cutting edge part 5 in the vicinity of the bent portion 6, thereby increasing the groove width of the breaking groove 7 at the above-mentioned end portion.

The groove width of the breaking groove 7 means the width of a groove portion contributing to chip curling action. For example, when the land 12 is disposed as in the present preferred embodiment, in a cross section substantially perpendicular to the outer cutting edge part 5, the distance from the end portion of the land 12 adjacent to the inside of the insert to the end portion of the rise face part 9 adjacent to the inside of the insert corresponds to the groove width of the breaking groove 7. That is, the distance from the end portion of the land 12 adjacent to the inside of the insert to the end portion of the rise face part 9 adjacent to the inside of the insert, which is substantially perpendicular to the cutting edge when viewed from above, corresponds to the groove width of the breaking groove 7. Specifically, the groove width of the breaking groove 7 can be measured with a projector, a cross-section measuring instrument, etc, as a dimension parallel to the bottom surface 15 in the above-mentioned distance. On the other hand, when a breaking groove is formed continuously with the cutting edge without having any land, the distance from the cutting edge to the end portion of the rise face part 9 adjacent to the inside of the insert, in the cross section substantially perpendicular to the cutting edge, corresponds to the width of the beaker groove, which can be measured in the same manner as above.

The first breaking groove 7a is formed so that the groove width thereof becomes larger toward an end portion thereof adjacent to the second cutting edge 5b. The second breaking groove 7b is formed so that the groove width thereof becomes larger toward an end portion thereof adjacent to the first cutting edge 5a. Thereby, the chips generated by the first cutting edge 5a firstly collide with the end portion of the first breaking groove 7a opposite from the end portion adjacent to the second cutting edge 5b. The chips generated by the second cutting edge 5b firstly collide with the end portion of the second breaking groove 7b opposite from the end portion adjacent to the first cutting edge 5a. That is, the chips generated by the first cutting edge 5a and the second cutting edge 5b can be firstly collided with both end portions of the breaking groove 7. Hence, the way to curl the chips generated by the outer cutting edge part 5 can be controlled by both end portions of the breaking groove 7. This stabilizes the disposing of chips, further improving chip discharging performance.

Here, let the groove width W of the breaking groove 7 be composed of a rake face part side width $w_8$ and a rise face part side width $w_9$. In this case, the groove width W of the breaking groove 7 has the above-mentioned relationship and also satisfies the relationship $w_8 < w_9$. That is, it is constructed so that the groove width $w_9$ of the rise face part 9 is larger than the groove width $w_8$ of the rake face part 8. Thereby, the shock during collision between chips and the breaker wall surface can be decreased, enabling effective reductions in the welding of chips and the cutting edge chipping. The term "the rake face part side width $w_8$" means a distance from the end portion of the rake face part 8 adjacent to the outside of the insert to the lowermost point of the breaking groove 7. The term "the rise face part side width $w_9$" means a distance from the end portion of the rise face part 9 adjacent to the inside of the insert to the lowermost point of the breaking groove 7.

In the breaking groove 7, the rake angle of the rake face part 8 is preferably, for example, approximately 5° to 25°. The rise angle of the rise face part 9 is preferably, for example, approximately 20° to 45°. The depth of the breaking groove 7 is preferably, for example, approximately 0.03 to 0.15 mm. The method of measuring the rake angle and the rise angle will be described in detail in a later-described second preferred embodiment. The depth of the breaking groove 7 can be found as a distance perpendicular to the bottom surface 15 extending from the outer cutting edge part 5 to the lowermost point of the breaking groove 7.

Figure 4:
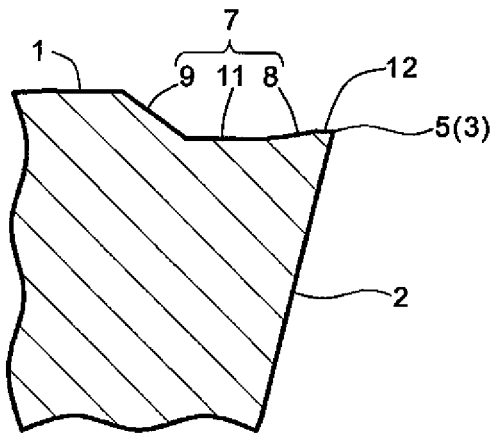
FIG. 4 is a partially enlarged sectional view showing other example of a breaking groove according to the first preferred embodiment of the invention.

The breaking groove 7 is not limited to those having these values. The breaking groove 7 in the present preferred embodiment is constructed in the shape whose cross section is curved, as shown in FIGS. 3(a) to 3(c). However, the breaking groove 7 may be in the shape having a flat bottom surface 11 between the rake face part 8 and the rise face part 9, as shown in FIG. 4. Alternatively, in the breaking groove 7, the rake face part 8 may be formed by a plurality of faces, and may have a two-stage rake face, for example.

On the other hand, the land 12 lying along the outer cutting edge part 5 and extending between the breaking groove 7 and the outer cutting edge part 5 has a predetermined land width. Although the land width depends on a work material and cutting conditions, it is normally approximately 0.05 to 0.15 mm. The land 12 improves cutting strength and reduces the cutting edge chipping.

As shown in FIGS. 1 and 2, the land 12 has a first land 12a lying along the first cutting edge 5a and extending between the first breaking groove 7a and the first cutting edge 5a, and a second land 12b lying along the second cutting edge 5b and extending between the second breaking groove 7b and the second cutting edge 5b.

The first land 12a has a maximum land width at an end portion of the first cutting edge 5a adjacent to the second cutting edge 5b, and the second land 12b has a maximum land width at an end portion of the second cutting edge 5b adjacent to the first cutting edge 5a. The land width at the end portion of the first land 12a adjacent to the second cutting edge 5b, and the land width at the end portion of the second land 12b adjacent to the first cutting edge 5a are the same.

That is, the land width of a portion of the land 12 corresponding to the bent portion 6 of the outer cutting edge part 5 shown in FIG. 3(b) is larger than the land width of other portion of the land 12 corresponding to a portion other than the bent portion 6 as shown in FIGS. 3(a) and 3(c). This ensures a large groove width of the breaking groove corresponding to the vicinity of the bent portion 6, thereby improving chip discharging performance, and additionally enhancing the cutting strength in the vicinity of the bent portion 6. As a result, the cutting edge chipping in the vicinity of the bent portion 6 can be reduced.

The first land 12a is formed so that the land width thereof becomes larger toward the end portion thereof adjacent to the second cutting edge 5b. The second land 12b is formed so that the land width thereof becomes larger toward the end portion thereof adjacent to the first cutting edge 5a. Thereby, the cutting performance of the cutting portions other than the bent portion 6 can be retained, while enhancing the cutting edge strength in the vicinity of the bent portion 6. That is, the cutting edge strength in the vicinity of the bent portion 6 can be enhanced, and the cutting resistance of the cutting portions other than the bent portion 6 can be lowered. This achieves compatibility between cutting strength and low resistance. The land width of the land 12 means a distance between both end portions of the land 12, which is substantially perpendicular to the cutting edge in a plan view. The above-mentioned distance can be measured by using a projector, a shape measuring instrument, or the like.

On the other hand, a breaking groove 16 (a third breaking groove) is formed in a concave shape along the inner cutting edge part 4 in the top surface 1. Like the breaking groove 7, the breaking groove 16 has a rake face part and a rise face part in order of increasing distance from the inner cutting edge part 4, with a land in between. The breaking groove 16 is formed so that the groove width thereof becomes larger from one end of the inner cutting edge part 4 toward the other end thereof (in the direction indicated by an arrow D in FIGS. 1 and 2). This achieves stable curling of chips on the outer peripheral side where the rotation speed is high and the cutting amount is large, without causing clogging of chips.

The groove width of the breaking groove 16 positioned at one end of the inner cutting edge part 4 is approximately 0.6 to 1.4 mm, preferably 0.8 to 1.2 mm. The groove width of the breaking groove 16 positioned at the other end of the inner cutting edge part 4 is approximately 1.0 to 1.8 mm, preferably 1.2 to 1.6 mm. The breaking groove 16 preferably satisfies the above predetermined relationship within these numerical value ranges.

In the breaking groove 16, the rake angle of the rake face part is preferably, for example, approximately 5° to 20°. The rise angle of the rise face part is preferably, for example, approximately 20° to 45°. The depth of the breaking groove 16 is preferably, for example, approximately 0.03 to 0.15 mm. The breaking groove 16 is not limited to those having these values. Otherwise, the construction is identical to that of the breaking groove 7 described above, and hence its description is omitted.

Second Preferred Embodiment

Figure 5:
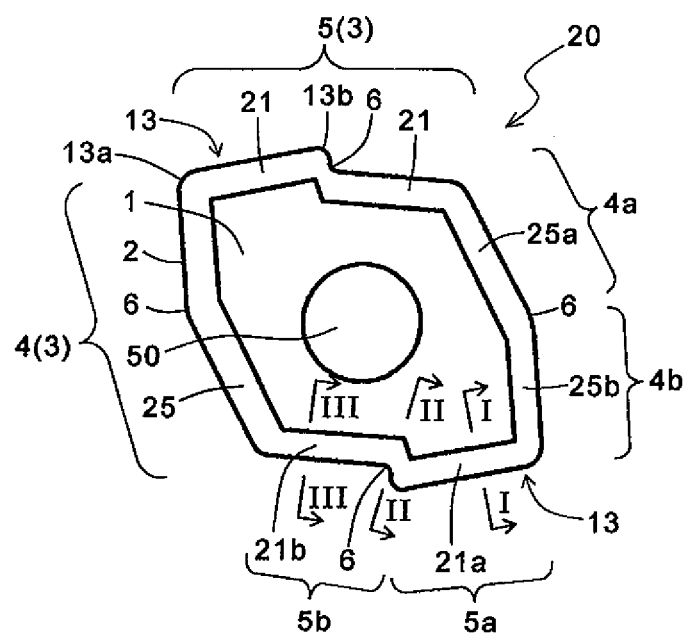
FIG. 5 is a schematic plan view showing an insert for a drill according to a second preferred embodiment of the invention.
Figure 6:
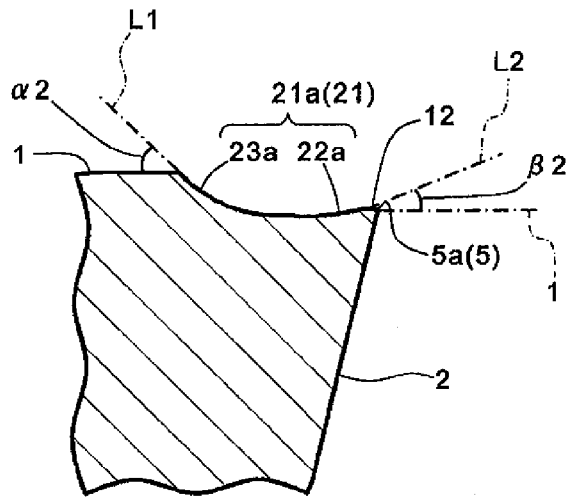
FIG. 6(a) is a diagram showing a cross section taken along the line I-I in FIG. 5.
FIG. 6(c) is a diagram showing a cross section taken along the line in FIG. 5.
Figure 6:
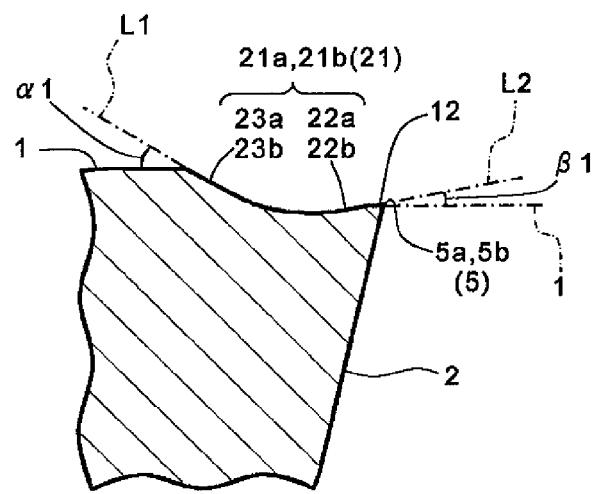
Figure 6:
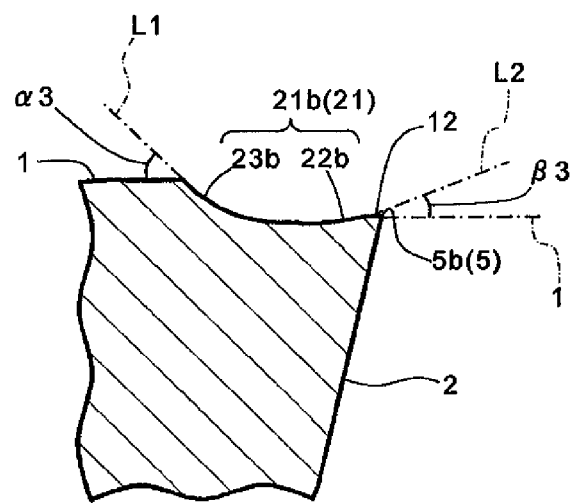

Next, a second preferred embodiment of the insert of the invention will be described in detail with reference to FIGS. 5 and 6. In FIGS. 5 and 6, parts having the same construction as FIGS. 1 to 4 described above are identified by the same reference numerals, and their descriptions are omitted.

Similarly to the foregoing first preferred embodiment, in an insert 20 according to the present preferred embodiment, breaking grooves 21 and 25 are formed in a concave shape along an outer cutting edge part 5 and an inner cutting edge part 4 in a top surface 1, respectively.

In these breaking grooves 21 and 25, the breaking groove 21 lying along the outer cutting edge part 5 has a first breaking groove 21a lying along the first cutting edge 5a in the top surface 1, and a second breaking groove 21b lying along the second cutting edge 5b in the top surface 1.

The first breaking groove 21a has a first rise face part 23a, as shown in FIG. 6(a). The first rise face part 23a is positioned adjacent to the center of the top surface 1 in the face part constituting the first breaking groove 21a, and inclined so as to be higher from outside toward inside of the top surface 1. The second breaking groove 21b has a second rise face part 23b, as shown in FIG. 6(c). The second rise face part 23b is positioned adjacent to the center of the top surface 1 in the face part constituting the second breaking groove 21b, and inclined so as to be higher from outside toward inside of the top surface 1.

The first rise face part 23a has a minimum rise angle at an end portion of the first cutting edge 5a adjacent to the second cutting edge 5b. The second rise face part 23b has a minimum rise angle at an end portion of the second cutting edge 5b adjacent to the first cutting edge 5a. The rise angle at the end portion of the first rise face part 23a adjacent to the second cutting edge 5b, and the rise angle at the end portion of the second rise face part 23b adjacent to the first cutting edge 5a are the same.

That is, a rise angle $\alpha 1$ of the rise face part of the breaking groove 21 corresponding to a bent portion 6 shown in FIG. 6(b) is smaller than each of rise angles $\alpha 2$ and $\alpha 3$ of other portions of the breaking groove 21 shown in FIGS. 6(a) and 6(c), corresponding to portions other than the bent portion 6. This achieves a smooth flow of chips generated by the outer cutting edge part 5, as in the foregoing first preferred embodiment. It is therefore possible to reduce situations where chips are welded onto the wall surface of the breaking groove 21, and cutting resistance increases, thereby exhibiting excellent chip discharging performance.

The rise angle $\alpha 1$ is preferably, for example, approximately 20° to 45°. Each of these rise angles $\alpha 2$ and $\alpha 3$ is preferably, for example, approximately 20° to 45°. It is desirable that the rise angles $\alpha 1$ to $\alpha 3$ satisfy the above-mentioned predetermined relationship within these numerical ranges as illustrated above, in order to enhance the effect described above.

As shown in FIG. 6, each of the rise angles $\alpha 1$ to $\alpha 3$ can be found as an angle formed between a virtual extensions L1 of each of these rise face parts 23a and 23b and a line parallel to the bottom surface 15 in a cross section substantially perpendicular to the outer cutting edge part 5. In the present preferred embodiment shown in FIGS. 6(a) to 6(c), because the top surface 1 is substantially parallel to the bottom surface 15, these rise angles $\alpha 1$ to $\alpha 3$ are plotted as an angle formed between the virtual extension L1 of each of these rise face parts 23a and 23b and the insert top surface. When the insert top surface is in a concave-convex shape, a curved surface or the like, as stated earlier, these rise angles $\alpha 1$ to $\alpha 3$ can be found using the bottom surface 15 as reference.

The first rise face part 23a is formed so that the rise angle thereof becomes smaller toward an end portion thereof adjacent to the second cutting edge 5b. The second rise face part 23b is formed so that the rise angle thereof becomes smaller toward an end portion thereof adjacent to the first cutting edge 5a. Thereby, the chips generated by the first cutting edge 5a firstly collide with the end portion of the first breaking groove 21a opposite from the end portion adjacent to the second cutting edge 5b. The chips generated by the second cutting edge 5b firstly collide with the end portion of the second breaking groove 21b opposite from the end portion adjacent to the first cutting edge 5a. That is, the chips generated by the first cutting edge 5a and the second cutting edge 5b can be firstly collided with both end portions of the breaking groove 21. Hence, the way to curl the chips generated by the outer cutting edge part 5 can be controlled by both end portions of the breaking groove 21. This stabilizes disposing of chips, further improving chip discharging performance.

The first breaking groove 21a has a first rake face part 22a, as shown in FIG. 6(a). The first rake face part 22a is positioned adjacent to the first cutting edge 5a in the face part constituting the first breaking groove 21a, and inclined so as to be lower from outside toward inside of the top surface 1. The second breaking groove 21b has a second rake face part 22b, as shown in FIG. 6(c). The second rake face part 22b is positioned adjacent to the second cutting edge 5b in the face part constituting the second breaking groove 21b, and inclined so as to be lower from outside toward inside of the top surface 1.

The first rake face part 22a has a minimum rake angle at an end portion of the first cutting edge 5a adjacent to the second cutting edge 5b. The second rake face part 22b has a minimum rake angle at an end portion of the second cutting edge 5b adjacent to the first cutting edge 5a. The rake angle at the end portion of the first rake face part 22a adjacent to the second cutting edge 5b, and the rake angle at the end portion of the second rake face part 22b adjacent to the first cutting edge 5a are the same.

That is, a rake angle β1 of the rake face part of the breaking groove 21 corresponding to the bent portion 6 shown in FIG. 6(b) is smaller than each of rake angles β2 and β3 of other portions of the breaking groove 21 shown in FIGS. 6(a) and 6(c), corresponding to portions other than the bent portion 6. This achieves a smooth flow of chips generated, as in the foregoing first preferred embodiment. It is therefore possible to reduce situations where chips are welded onto the wall surface of the breaking groove 21, and cutting resistance increases, thereby exhibiting excellent chip discharging performance.

The rake angle β1 is preferably, for example, approximately 5° to 25°. These rake angles β2 and β3 are preferably, for example, approximately 5° to 20°. It is desirable that these rake angles β1 to β3 satisfy the above-mentioned predetermined relationship within these numerical ranges as illustrated above, in order to enhance the effect described above.

Each of the rake angles ⊕1 to β3 can be found as an angle formed between a virtual extension L2 of each of the rake face parts 22a and 22b and a line parallel to the bottom surface 15, in a cross section substantially perpendicular to the outer cutting edge part 5. In the present preferred embodiment shown in FIGS. 6(a) to 6(c), because the top surface 1 is substantially parallel to the bottom surface 15, each of these rake angles β1 to β3 is plotted as an angle formed between the virtual extension L2 of the rake face parts 22a and 22b and the top surface 1. When the top surface is in a concave-convex shape, a curved surface, or the like, these rake angles β1 to β3 can be found using the bottom surface 15 as reference.

When these rake face parts 22a and 22b are formed by a curved surface, these β1 to β3 can be found as follows, in the sectional views shown in FIGS. 6(a) to 6(c). Firstly, a virtual straight line at a junction between each of these rake face parts 22a and 22b and the land or the cutting edge is plotted. Then, the angle formed between the virtual straight line and a line parallel to the bottom surface 15 can be found as these rake angles β1 to β3, respectively. When these rise face parts 23a and 23b are formed by a curved surface, they can be found in the same manner as above.

The first rake face part 22a is formed so that the rake angle thereof becomes smaller toward an end portion thereof adjacent to the second cutting edge 5b. The second rake face part 22b is formed so that the rake angle thereof becomes smaller toward an end portion thereof adjacent to the first cutting edge 5a. Thereby, the cutting performance of the cutting portions other than the bent portion 6 can be retained, while enhancing the cutting edge strength in the vicinity of the bent portion 6.

That is, the cutting edge strength in the vicinity of the bent portion 6 can be enhanced, and the cutting resistance of the cutting portions other than the bent portion 6 can be lowered. This achieves compatibility between cutting strength and low resistance.

The depth of the breaking groove 21 is preferably, for example, approximately 0.03 to 0.15 mm, and the groove width is preferably, for example, approximately 1.2 to 2 mm. The breaking groove 21 is not limited to those having these values.

On the other hand, in a breaking groove 25 lying along the inner cutting edge part 4, like the breaking groove 21 of the outer cutting edge part 5, the rise angle of the rise face part of the breaking groove corresponding to the bent portion 6 is smaller than the rise angle of other portion of the rise face part of the breaking groove. The rake angle of the rake face part of the breaking groove corresponding to the bent portion 6 is smaller than the rake angle of other portion of the rake face of the breaking groove.

That is, the inner cutting edge part 4 has a first cutting edge 4a formed on one side of an intersection part between the top surface 1 and the side surface 2, and a second cutting edge 4b formed on the other side of the intersection part. The second cutting edge 4b is intersected with the first cutting edge 4a so as to have an outward convexity when viewed from above. Thereby, there is formed the bent portion 6 being bent in a convex shape when viewed from above.

Like the breaking groove 21 described above, the breaking groove 25 has a first breaking groove 25a lying along the first cutting edge 4a in the top surface 1, and a second breaking groove 25b lying along the second cutting edge 4b in the top surface 1.

The first breaking groove 25a has a first rise face part (not shown). The first rise face part is positioned adjacent to the center of the top surface 1 in the face part constituting the first breaking groove 25a, and inclined so as to be higher from outside toward inside of the top surface 1. The second breaking groove 25b has a second rise face part (not shown). The second rise face part is positioned adjacent to the center of the top surface 1 in the face part constituting the second breaking groove 25b, and inclined so as to be higher from outside toward inside of the top surface 1.

The first rise face part has a minimum rise angle at an end portion of the first cutting edge 4a adjacent to the second cutting edge 4b. The second rise face part has a minimum rise angle at an end portion of the second cutting edge 4b adjacent to the first cutting edge 4a. The rise angle at the end portion of the first rise face part adjacent to the second cutting edge 4b, and the rise angle at the end portion of the second rise face part adjacent to the first cutting edge 4a are the same. That is, the rise angle of the rise face part of the breaking groove 25 corresponding to the bent portion 6 is smaller than the rise angle of the rise face part of the breaking groove 25 except the breaking groove 25 corresponding to the bent portion 6. Thereby, the chips generated by the first cutting edge 4a and the second cutting edge 4b can be firstly collided with both end portions of the breaking groove 25. Hence, if thickness increase occurs at the portions of chips generated by the inner cutting edge part 4 which are specifically generated by the bent portion 6, the chips generated by the inner cutting edge 4 can be further smoothly curled. Hence, it is possible to reduce situations where the chips generated by the inner cutting edge part 4 collide with the breaking groove 25 and adhere thereto.

The first breaking groove 25a also has a first rake face part (not shown). The first rake face part is positioned adjacent to the first cutting edge 4a in the face part constituting the first breaking groove 25a, and inclined so as to be lower from outside toward inside of the top surface 1. The second breaking groove 25b has a second rake face part (not shown). The second rake face part is positioned adjacent to the second cutting edge 4b in the face part constituting the second breaking groove 25b, and inclined so as to be lower from outside toward inside of the top surface 1.

The first rake face part has a minimum rake angle at an end portion of the first cutting edge 4a adjacent to the second cutting edge 4b. The second rake face part has a minimum rake angle at an end portion of the second cutting edge 4b adjacent to the first cutting edge 4a. The rake angle at the end portion of the first rise face part adjacent to the second cutting edge 4b, and the rake angle at the end portion of the second rake face part adjacent to the first cutting edge 4a are the same. That is, the rake angle of the rake face part of the breaking groove 25 positioned at the bent portion 6 is smaller than the rake angle of other portion of the rake face part of the breaking groove 25 positioned at a portion other than the bent portion 6. Thereby, the inner cutting edge part 4 can also produce the same effect as the outer cutting edge part 5 described above.

In the breaking groove 25 corresponding to the bent portion 6, the rise angle of the rise face part is preferably, for example, approximately 20° to 45°. The rake angle of the rake face part is preferably, for example, approximately 5° to 25°. In other portions of the breaking groove 25 corresponding to portions other than the bent portion 6, the rise angle of the rise face part is preferably, for example, approximately 20° to 45°, and the rake angle of the rake face part is preferably, for example, approximately 5° to 20°. It is desirable that the rise angle and the rake angle satisfy the above-mentioned predetermined relationship within these numerical ranges as illustrated above.

The depth of the breaking groove 25 is preferably, for example, approximately 0.03 to 0.15 mm, and the groove width thereof is preferably, for example, approximately 1.2 to 2 mm. The breaking groove 25 is not limited to those having these values. Otherwise, the construction is identical to that of the breaking groove 21 of the outer cutting edge part 5 described above.

<Drill>

Figure 7:
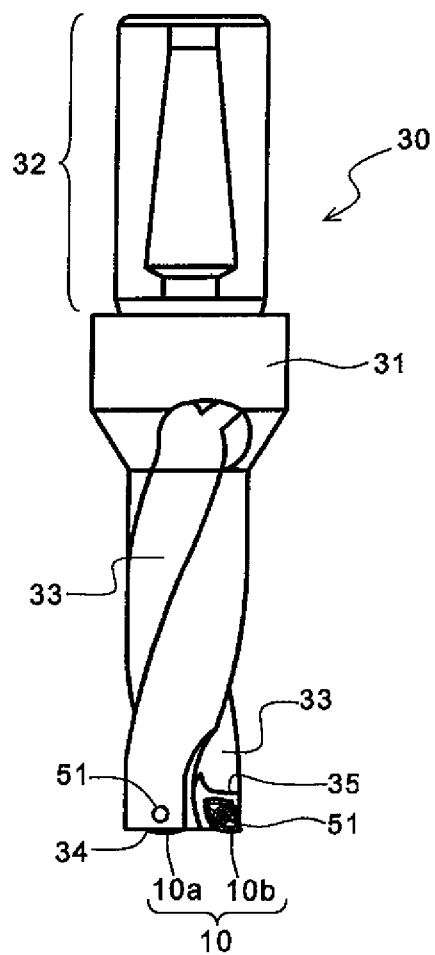
FIG. 7 is a side view showing a drill according to an embodiment of the invention.
Figure 8:
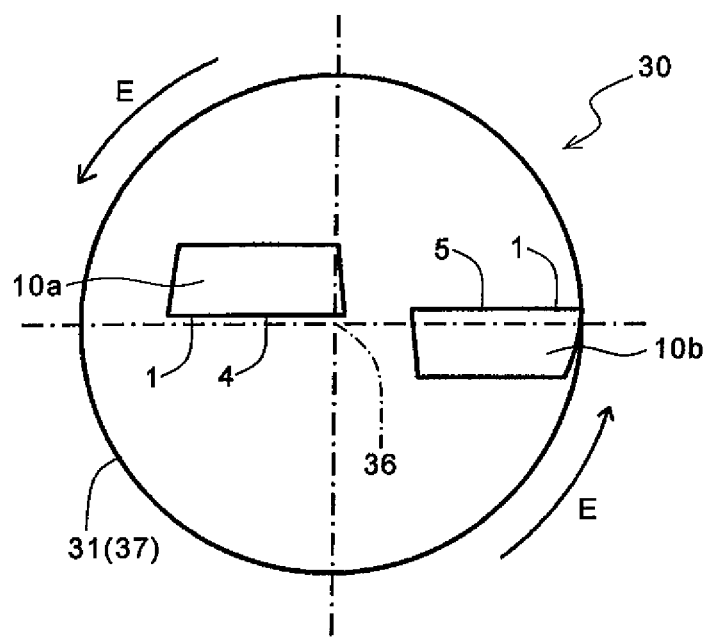
FIG. 8 is a schematic front view showing the drill according to the embodiment of the invention.
Figure 9:
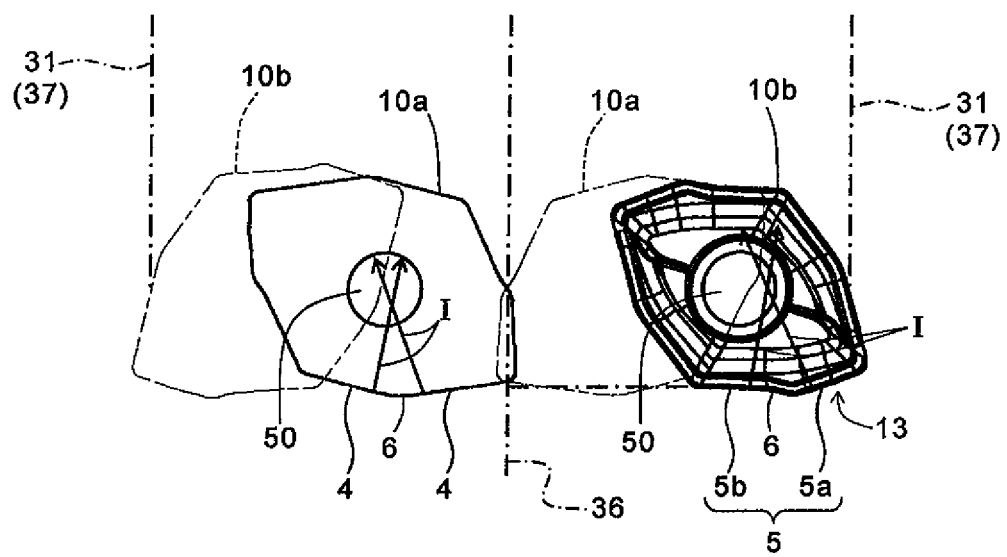
FIG. 9 is a schematic explanatory drawing showing a cutting state by the drill according to an embodiment of the invention.

Next, a preferred embodiment of the drill according to the invention will be described in detail with reference to FIGS. 7 to 9, taking for example the case of mounting the insert 10 according to the foregoing first preferred embodiment. In FIG. 9, the insert indicated by a dashed line shows a state where the insert indicated by a solid line is rotated through 180 degrees. In FIGS. 7 to 9, parts having the same construction as FIGS. 1 to 6 described above are identified by the same reference numerals, and hence their descriptions are omitted.

As shown in FIG. 7, a drill 30 of the present preferred embodiment is one in which two inserts 10 are mounted on the tip end portion of a holder 31. One of these two inserts 10 is an inner blade insert 10a and the other is an outer blade insert 10b.

Specifically, the holder 31 has a substantially cylindrical shape and has on its rear end side a shank part 32 for fixing the holder 31 to a machine tool. On the tip end side of the holder 31, a chip discharge groove 33 for discharging chips from the tip end toward the shank part 32 extends spirally in a longitudinal direction. The tip end portion of the holder 31 is provided with an inner blade insert pocket 34 for mounting the inner blade insert 10a, and an outer blade insert pocket 35 for mounting the outer blade insert 10b.

The tip end side of the inner blade insert pocket 34 and the tip end side of the outer blade insert pocket 35 in the axial direction of the holder 31 are opened. The inner blade insert pocket 34 is used for detachably mounting the inner blade insert 10a and formed radially inside (the central axis side) of the holder 31. The outer blade insert pocket 35 is used for detachably mounting the outer blade insert 10b and formed radially outside (the outer peripheral side) of the holder 31. The outer peripheral side of the hole bottom surface of the outer blade insert pocket 35 is also opened.

The inner blade insert 10a for cutting the inner peripheral side of the hole bottom surface, and the outer blade insert 10b for cutting the outer peripheral side of the hole bottom surface are mounted in different mounting directions into the inner blade insert pocket 34 and the outer blade insert pocket 35, respectively.

In mounting, firstly, the inner blade insert 10a and the outer blade insert 10b are placed at the inner blade insert pocket 34 and the outer blade insert pocket 35, respectively. At this time, as shown in FIGS. 8 and 9, the inner cutting edge part 4 (the third cutting edge) in the inner blade insert 10a and the outer cutting edge part 5 (the first cutting edge 5a and the second cutting edge 5b) of the outer blade insert 10b are projected from the tip end in the axial direction of the holder 31, respectively. Further, the rotation loci of the inner cutting edge part 4 and the outer cutting edge part 5 in the tip end side in the axial direction intersect each other and cover from an axis 36 to a side surface 37 of the holder 31.

Alternatively, the whole of each of the inner cutting edge part 4 and the outer cutting edge part 5 may not be projected from the tip end of the holder 31. That is, at least part of each cutting edge may be projected from the tip end of the holder 31 depending on a work material and cutting conditions.

Then, as shown in FIG. 7, clamp screws 51 are inserted into through holes 50 of the inner blade insert 10a and the outer blade insert 10b, respectively, and the tip end sides of these clamp screws 51 are screwed into screw holes (not shown) formed in the inner blade insert pocket 34 and the outer blade insert pocket 35, respectively. Thereby, the inner blade insert 10a and the outer blade insert 10b are mounted into the inner blade insert pocket 34 and the outer blade insert pocket 35, respectively.

In the inner blade insert 10a mounted into the inner blade insert pocket 34, the groove width of the breaking groove 16 (the third breaking groove) increases toward the outer peripheral side of the holder 31. In the outer blade insert 10b mounted into the outer blade insert pocket 35, as shown in FIGS. 7 and 9, the first cutting edge 5a is inclined with increasing distance from the second cutting edge 5b, from the tip end side of the holder 31 toward the shank part 32 side (the basal end side).

In the inner blade insert 10a and the outer blade insert 10b mounted into their corresponding insert pockets, as shown in FIG. 8, their respective top surfaces 1 are directed to the same rotation direction (the direction indicated by an arrow E). That is, the top surface 1 of the inner blade insert 10a and the top surface 1 of the outer blade insert 10b are directed in 180 degree opposite directions. Then, by rotating the holder 31 around the axis 36 of the holder 31, hole machining of a work material is carried out by the inner blade insert 10a and the outer blade insert 10b.

As stated earlier, each of the inner cutting edge part 4 and the outer cutting edge part 5 in the insert 10 has the bent portion 6 that is bent in a convex shape when the insert 10 is viewed from above. Therefore, with the insert 10 mounted on the holder 31, cutting edges having opposite inclinations with the bent portion 6 in between are formed in the cutting edge parts with respect to the hole bottom surface.

That is, as shown in FIG. 9, inner cutting edge parts 4 having the opposite inclinations with the bent portion 6 in between are formed with respect to the hole bottom surface in the inner cutting edge part 4 of the inner blade insert 10a, and outer cutting edge parts 5 (a first cutting edge 5a and a second cutting edge 5b) having opposite inclinations with the bent portion 6 in between are formed with respect to the hole bottom surface in the outer cutting edge part 5 of the outer blade insert 10b.

When the hole machining is carried out by the insert 10 in this state, chips are generated from the Opposite directions (namely, the directions indicated by arrows I) with the bent portion 6 in between. Even if chips come out in the reverse direction for the above-mentioned reason, the insert 10 achieves a smooth flow of these chips. It is therefore possible to reduce situations where chips are welded onto the wall surfaces of the breaking grooves 7 and 16, and cutting resistance increases. Hence, the insert 10 and the drill 30 with the insert 10 mounted thereon are capable of exhibiting excellent chip discharging performance.

Mounting the insert 20 of the second preferred embodiment instead of the insert 10 of the first preferred embodiment produces the same effect as that obtained by mounting the insert 10.

<Method of Cutting Work Material>

Figure 10:
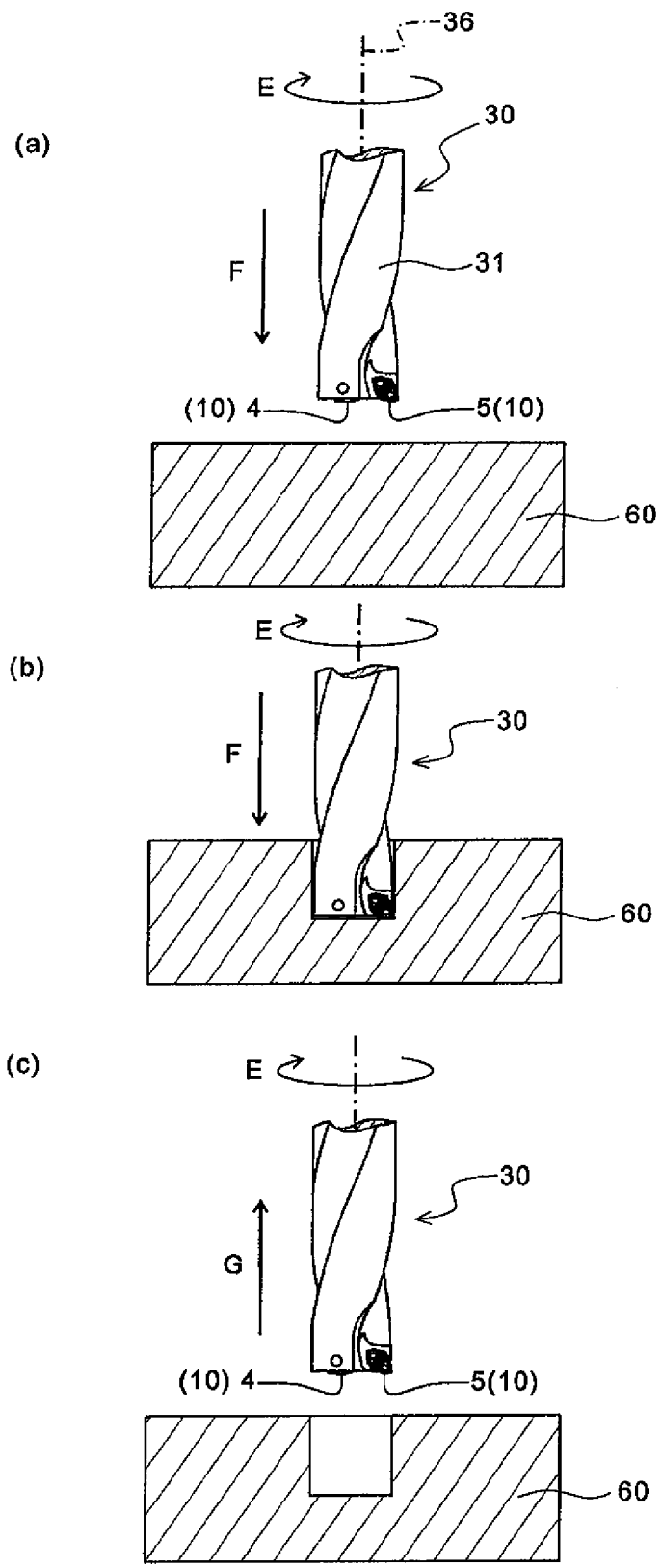
FIGS. 10(*a*) to 10(*c*) are schematic explanatory drawings showing a method of cutting a work material according to an embodiment of the invention.

A preferred embodiment of the method of cutting a work material according to the invention will be described in detail with reference to FIGS. 10(a) to 10(c), taking for example the case of using the drill 30. The method of cutting a work material in the present embodiment has the following steps (i) to (iii):

(i) as shown in FIG. 10(a), the step of bringing the outer cutting edge part 5 (the first cutting edge 5a and the second cutting edge 5b) and the inner cutting edge part 4 (the third cutting edge) of the drill 30 near a work material 60 by rotating the drill 30 around the axis 36 of the holder 31 in the direction indicated by an arrow E, and moving it in the direction indicated by an arrow F;

(ii) as shown in FIG. 10(b), the step of cutting the work material 60 (hole machining) by further moving the drill 30 in the direction indicated by the arrow F, and bringing at least portions of the outer cutting edge part 5 and the inner cutting edge part 4 of the drill 30 into contact with the surface of the work material 60; and (iii) as shown in FIG. 10(c), the step of keeping the outer cutting edge part 5 and the inner cutting edge part 4 away from the work material 60 by moving the drill 30 in the direction indicated by an arrow G.

Here, the above-mentioned insert 10 is mounted on the drill 30. Therefore, the chip discharging performance of the drill 30 and its biting action into the work material can be improved to exhibit excellent working accuracy. This provides a well-finished surface of a work material having a high degree of difficulty under more severe cutting conditions.

In the above step (i), at least one of the drill 30 and the work material 60 may be rotated. The individual cutting edges and the work material 60 may relatively close to each other. For example, the work material 60 may be brought near the individual cutting edges. Similarly, in the above step (iii), the work material 60 and the individual cutting edges may relatively separate from each other. For example, the work material 60 may be separated from the individual cutting edges. When cutting is continued, the step of bringing the individual cutting edges of the drill 30 into contact with different points of the work material 60 may be repeated, keeping the drill 30 and/or the work material 60 rotating. When the cutting edge in use is worn, an unused cutting edge may be used by rotating the insert 1 through 180 degrees with respect to the central axis of the through hole 50.

While the several preferred embodiments of the present invention have been described and illustrated above, it is to be understood that the present invention is not limited to the foregoing preferred embodiments and applicable to those in which changes and improvements are made thereto without departing from the spirit or scope of the present invention. For example, the invention is not to be considered to be limited to these inserts according to the first and second preferred embodiments, respectively, and may be an insert according to other preferred embodiment attained by combining these first and second preferred embodiments. This insert achieves a more smooth flow of chips generated. This surely reduces the welding of chips onto the wall surface of the breaking groove, and also reduces an increase in cutting resistance, thereby exhibiting particularly excellent chip discharging performance.

Although in the foregoing preferred embodiments, the descriptions have been made of the cases where the breaking grooves lie along the inner cutting edge part 4 and the outer cutting edge part 5 in the top surface 1, respectively, the breaking groove may be formed in the top surface 1 only along either of them. That is, the breaking groove is formed along the outer cutting edge part 5 only in the top surface 1, and no breaking groove is formed in the top surface 1 along the inner cutting edge part 4. Otherwise, the construction is identical to those of the foregoing preferred embodiments.

Although in the foregoing preferred embodiments, the descriptions have been made of the cases where the second cutting edge 5b is intersected with the first cutting edge 5a so as to have the outward convexity when viewed from above, the second cutting edge in the invention may be intersected with the virtual extension of the first cutting edge so as to have the outward convexity when viewed from above. Here, the second cutting edge intersecting with the virtual extension of the first cutting edge so as to be the outward convexity means the second cutting edge having a virtual extension intersecting with the virtual extension of the first cutting edge so as to be the outward convexity.

The invention claimed is:

1. An insert for a drill, comprising:
an insert main body with a top surface and a side surface;
wherein the insert main body comprises
  a cutting edge on an intersection part of the top surface and the side surface which comprises a bent portion projected outward when viewed from the top surface, and
  a breaking groove on the top surface which comprises a concave shape along the cutting edge,
wherein a width of the breaking groove is a maximum at a position corresponding to the bent portion,
wherein the breaking groove comprises a rise face part inclined higher as a distance from the cutting edge increases, and
wherein the rise face part comprises a minimum rise angle at the position corresponding to the bent portion.

2. The insert for a drill according to claim 1, wherein the width of the breaking groove becomes larger from a position corresponding to an one end of the cutting edge to the position corresponding to the bent portion.

3. The insert for a drill according to claim 2, wherein the width of the breaking groove becomes larger from a position corresponding to the other end of the cutting edge to the position corresponding to the bent portion.

4. The insert for a drill according to claim 1, wherein the insert main body further comprises a land along the cutting edge at a position between the breaking groove and the cutting edge, and wherein a width of the land is maximum at the position corresponding to the bent portion.

5. The insert for a drill according to claim 4, wherein the width of the land becomes larger from a position corresponding to an one end of the cutting edge to the position corresponding to the bent portion.

6. The insert for a drill according to claim 5, wherein the width of the land becomes larger from a position corresponding to the other end of the cutting edge to the position corresponding to the bent portion.

7. The insert for a drill according to claim 1, wherein the insert main body further comprises another cutting edge on at least a part of an intersection part of the top surface and other side surface different from the side surface; and another breaking groove which comprises a concave shape along the other cutting edge, wherein a width of the other breaking groove becomes larger from a position corresponding to an one end of the cutting edge to a position corresponding to the other end of the cutting edge.

8. An insert for a drill, comprising:

an insert main body with a top surface and a side surface;

wherein the insert main body comprises a cutting edge on an intersection part of the top surface and the side surface which comprises a bent portion projected outward when viewed from the top surface, and a breaking groove on the top surface which comprises a concave shape along the cutting edge, wherein a width of the breaking groove is a maximum at a position corresponding to the bent portion, wherein the breaking groove comprises a rake face part inclined higher as a distance from the cutting edge decreases, and wherein the rake face part comprises a minimum rake angle at the position corresponding to the bent portion.

9. The insert for a drill according to claim 8, wherein the width of the breaking groove becomes larger from a position corresponding to an one end of the cutting edge to the position corresponding to the bent portion.

10. The insert for a drill according to claim 9, wherein the width of the breaking groove becomes larger from a position corresponding to the other end of the cutting edge to the position corresponding to the bent portion.

11. The insert for a drill according to claim 8, wherein the insert main body further comprises a land along the cutting edge at a position between the breaking groove and the cutting edge, and wherein a width of the land is maximum at the position corresponding to the bent portion.

12. The insert for a drill according to claim 11, wherein the width of the land becomes larger from a position corresponding to an one end of the cutting edge to the position corresponding to the bent portion.

13. The insert for a drill according to claim 12, wherein the width of the land becomes larger from a position corresponding to the other end of the cutting edge to the position corresponding to the bent portion.

14. The insert for a drill according to claim 8, wherein the insert main body further comprises another cutting edge on at least a part of an intersection part of the top surface and other side surface different from the side surface; and another breaking groove which comprises a concave shape along the other cutting edge, wherein a width of the other breaking groove becomes larger from a position corresponding to an one end of the cutting edge to a position corresponding to the other end of the cutting edge.

* * * * *